No. 703,176. Patented June 24, 1902.
F. A. BROCQ & A. BLANCHET.
ELECTRIC METER.
(Application filed Mar. 27, 1902.)
(No Model.) 2 Sheets—Sheet 1.

No. 703,176. Patented June 24, 1902.
F. A. BROCQ & A. BLANCHET.
ELECTRIC METER.
(Application filed Mar. 27, 1902.)
(No Model.) 2 Sheets—Sheet 2.

UNITED STATES PATENT OFFICE.

FRANÇOIS ALEXANDRE BROCQ AND ARTHUR BLANCHET, OF PARIS, FRANCE, ASSIGNORS TO COMPAGNIE POUR LA FABRICATION DES COMPTEURS ET MATÉRIEL D'USINES À GAZ, SOCIÉTÉ ANONYME, OF PARIS, FRANCE.

ELECTRIC METER.

SPECIFICATION forming part of Letters Patent No. 703,176, dated June 24, 1902.

Application filed March 27, 1902. Serial No. 100,196. (No model.)

*To all whom it may concern:*

Be it known that we, FRANÇOIS ALEXANDRE BROCQ, electrical engineer, residing at and whose postal address is 16 Boulevard de Vaugirard, and ARTHUR BLANCHET, electrical engineer, residing at and whose postal address is 23 Boulevard Montparnasse, Paris, France, citizens of the Republic of France, have invented a certain new and useful Improvement in Electric Meters; and we do hereby declare that the following is a full, clear, and exact specification of the same.

The present invention relates to an electric meter and is applicable to any meter of the motor type, the object of the invention being to arrange the operative parts of the meter in such a way that the commutator and brushes which require inspection and cleaning or renewal from time to time may be accessible to the person authorized to inspect them without rendering the other parts of the meter accessible, so that the inspection can be accomplished without giving the inspector any opportunity to tamper with the parts which indicate the meter-reading.

In accordance with the invention the operative parts of the meter are so arranged that while the main elements of the motor and its connection with the wheel-trains which accomplish the registering are inclosed in a main case the commutator and brushes and one member of the bearing of the armature-shaft are accessible without disturbing said main casing and are inclosed in a special casing detachably secured to the said main casing, said special casing being arranged to be sealed or locked in such a manner as to be accessible only to the inspector. When, therefore, the meter is to be repaired or cleaned, it is necessary only to remove this special casing, which renders the parts which require attention accessible without, however, affording access to the registering mechanism, so that the reading cannot be changed.

Figure 1:
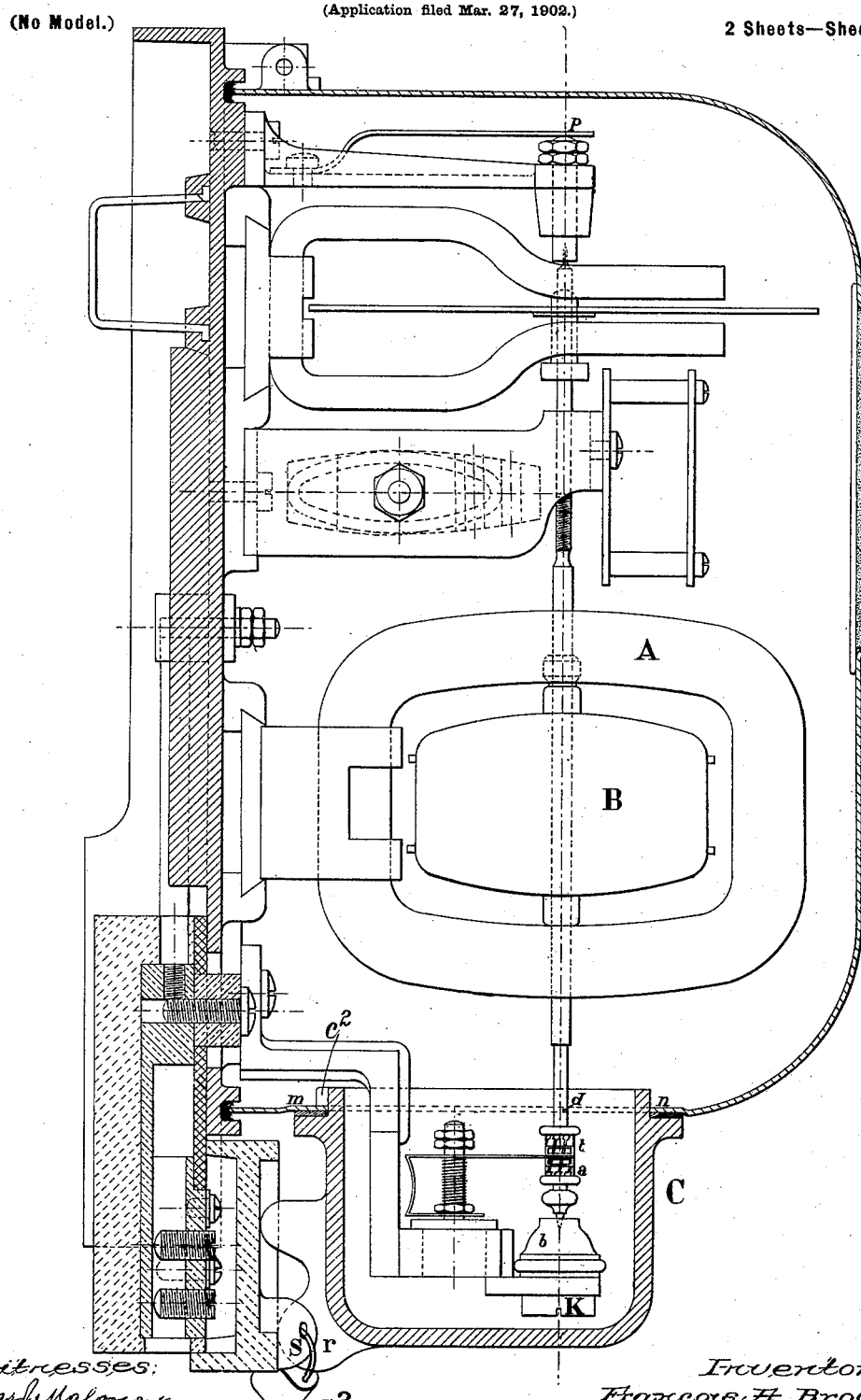
Figure 2:
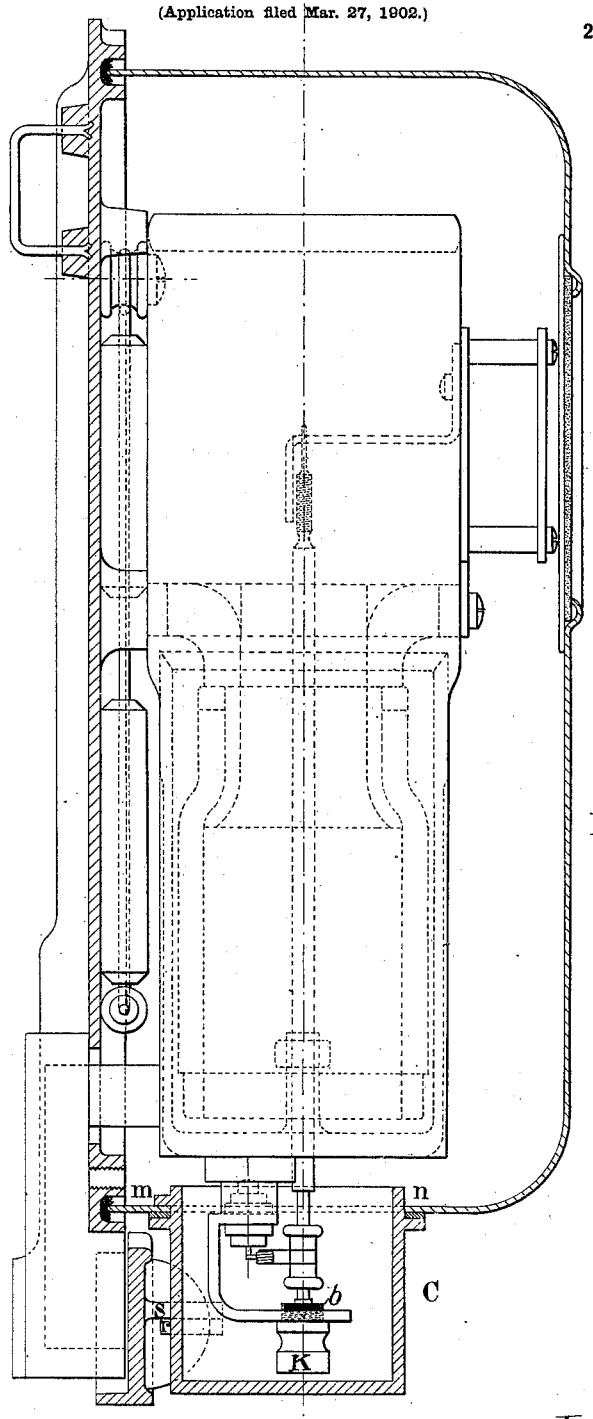

Figure 1 is a vertical section of a meter embodying the invention; and Fig. 2 a similar vertical section of a meter differing in construction, but having the same invention embodied therein.

It is obvious that the invention is applicable to various meters of the motor type, and it is not thought necessary in describing the invention to explain the details of construction or method of operation of the meter itself, since the invention is embodied merely in a construction and arrangement of the parts such that the commutator and brushes can be inclosed in a casing which is separate from the main casing which incloses the other parts of the meter.

As herein shown the field-magnet A and the armature B, Fig. 1, together with the mechanism which operates the indicating devices, are inclosed in a main case D, which is practically sealed up, so that the parts contained therein will be inaccessible unless the whole apparatus is taken to pieces. The shaft $d$, which carries the armature B, however, is shown as extended, so as to pass through an opening in the casing D, the said opening being indicated by the letters $m\ n$ and shown as formed in the lower portion of the casing, through which the armature-shaft $d$ extends, and the commutator $a$ and brushes $t$ are arranged outside of the casing D. One of the bearing members $b$ for the shaft $d$ is also shown as outside the main casing, the said bearing being adjustable to take up wear, if necessary, as indicated at K. These parts, which extend through the opening in the main case D, are shown, in accordance with the invention, inclosed in a supplemental box or casing C, which is adapted to be secured to the casing D in any suitable or usual way, as by an ordinary bayonet-joint, the said box being shown as provided with tongues or projections $c^2$, which are arranged to enter corresponding recesses around the opening in the casing D, so that by slipping the projections through the said openings and then turning the box it can be secured in position.

In order to lock or seal the box when once closed, it is shown as provided with a projection $r$, adapted when the tongues $c^2$ are in position to hold the box closed to coöperate with the corresponding projection S on the frame of the machine, the two parts being connected by means of a suitable lock or seal which cannot be tampered with except by the inspector. As indicated in Fig. 1 for purposes of illustration, a padlock S² is employed.

The construction shown in Fig. 2 merely illustrates the invention as applied to a meter of different construction, the arrangement, so far as relates to the invention, being substantially the same as in Fig. 1. The same reference-letters are therefore used in Fig. 2 as in Fig. 1, and no further detailed description is deemed necessary.

We claim—

In a motor-meter the combination with a casing to contain the motor and indicating or registering mechanism, said casing being provided with an opening; of the armature-shaft and commutator of the said motor and one of the bearings for said armature-shaft extending out of said casing through said opening; and a supplemental casing or box detachably secured to the main casing to inclose said commutator and brushes and the bearing, as set forth.

In witness whereof we have hereunto set our hands, this 14th day of March, 1902, in the presence of two subscribing witnesses.

FRANÇOIS ALEXANDRE BROCQ.
ARTHUR BLANCHET.

Witnesses:
DOUGLAS HORACE BRANDON,
EDWARD P. MACLEAN.